D. N. FORD.
WEEDING IMPLEMENT.
No. 180,217.  Patented July 25, 1876.
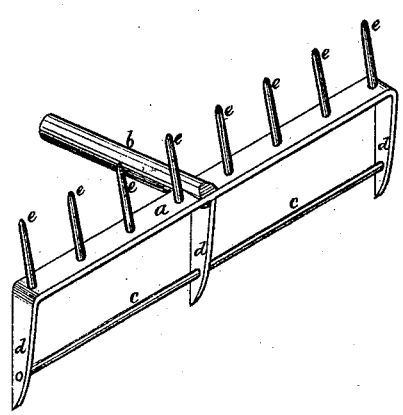
Witnesses.  Daniel N. Ford,
  by his attorney.

UNITED STATES PATENT OFFICE.

DANIEL N. FORD, OF BOSTON, MASSACHUSETTS.

IMPROVEMENT IN WEEDING IMPLEMENTS.

Specification forming part of Letters Patent No. 180,217, dated July 25, 1876; application filed June 28, 1876.

*To all whom it may concern:*

Be it known that I, DANIEL N. FORD, of Boston, of the county of Suffolk and State of Massachusetts, have invented a new and useful or Improved Implement for Weeding Land; and do hereby declare the same to be fully described in the following specification and represented in the accompanying drawing, which is a perspective view of the said implement as it appears without its handle.

In such drawing, $a$ denotes a bar or head, provided at its middle with a socket-piece or shank, $b$, for the fixation of said bar or head to a long handle, like that of a common rake. Parallel to such head and below it, at a suitable distance from it, is a bar or rod, $c$, supported by teeth or connections $d$, extended from the bar $a$ at right angles, as shown. The bar $c$ may be at the ends of the said connections, or such ends may be pointed and project beyond the said bar, in manner as shown, in which case they answer as teeth to penetrate the soil with the bar. The weeder so made I usually combine or furnish with a series of rake-teeth, $e$, projecting upward from the head $a$, and with respect to the connections $d$ and bar $c$ in manner as represented, in which case the weeder may be employed as a rake.

In using the weeder, it is to be forced down into the ground, so as to cause the bar or rod $c$ to penetrate it to the necessary depth, after which the implement is to be pulled backward in a manner to draw the rod $c$ along underneath the surface of the soil and against the stems and roots of the weeds, which, catching upon the bar $c$, will be extracted by it from the ground.

In cases where necessary, the soil may be first loosened by the rake-teeth, which, after extraction of the weeds, may be used to rake them off the surface or into piles thereon.

In practice the weeder has been found to operate to excellent advantage, particularly in a garden.

I claim—

1. The weeder, substantially as described, consisting of the head $a$, the rod $c$, and their connections $d$, arranged and provided with a socket-piece or shank, $b$, all as explained.

2. The combined rake and weeder, substantially as described, consisting of the series of teeth $e$, the head $a$, rod $c$, connections $d$, and socket-piece or shank $b$, arranged essentially as set forth.

DANIEL N. FORD.

Witnesses:
R. H. EDDY,
J. R. SNOW.